Patented Aug. 3, 1937

2,088,868

UNITED STATES PATENT OFFICE

2,088,868

PATINA FOR COPPER

Frank F. Poland, Baltimore, Md., assignor to American Smelting and Refining Company, New York, N. Y., a corporation of New Jersey No Drawing. Application October 4, 1932, Serial No. 636,188

8 Claims. (Cl. 204—1)

This invention is concerned with the art of producing patina on copper and relates particularly to a novel electrolytic process for readily effecting patina formation.

In contrast to the production of natural patina by long and continuous exposure and weathering, the present invention provides an electrolytic method incorporating control measures of operation adapted for the rapid formation of patina in any of several desired colors or shades thereof.

Of especial importance is the remarkable adherent quality of the patina produced by the present invention. The present invention also provides a method of controlling the degree of adherence which the finished product will exhibit.

Briefly, the invention provides for applying patina to copper by immersing the copper to be treated in an appropriate non-oxidizing electrolyte such as an aqueous solution of sodium carbonate with sodium sulphite, sodium acid sulphite, sulphur dioxide or a combination of these compounds or compounds yielding a similar effect and subjecting the same to electrolysis.

More specifically, the invention may be practiced as follows: sulphur dioxide gas, for example, may be bubbled through water until the solution is of the proper concentration, as shown by titration with NaOH and methyl orange or other suitable tests. A proper amount of sodium carbonate is then incorporated in the sulphur dioxide solution and the copper sheets thereafter used as anodes in electrolyzing the solution. After one or two minutes, the current may be turned off and the copper sheets on which the patina forms may be removed and used as desired.

For some particular shades of patina, it may be desirable to subject the sheets to a sizing process to aid in fixing the patina until the material is installed, which may be accomplished by spraying a glue solution upon the sheets. This is not mandatory, however, as patina having a natural green color may be produced by the invention which will endure not only exceedingly rough handling and installation operations, but will not dissolve to any appreciable extent when exposed to rains and severe weathering conditions.

As the color, texture and adherent properties of the patina produced are influenced by the ratio of sulphur dioxide to sodium carbonate and the concentration of the particular ratio in the aqueous solution, a few examples concerning the amount of reagents and operating conditions are set forth in the following table:

| Grams per liter $SO_2$ | Grams per liter $Na_2CO_3$ | Current density, amperes per sq. ft. | Cell voltage | Time in minutes |
|---|---|---|---|---|
| 0.5 | 20 | 50 | 15 | 2 |
| 0.5 | 20 | 100 | 26 | 1 |
| 2.5 | 30 | 100 | 22 | 1 |
| 2.5 | 30 | 150 | 29 | 2/3 |
| 2.5 | 40 | 150 | 21 | 2/3 |
| 2.5 | 40 | 200 | 30 | 1/2 |
| 5.0 | 40 | 50 | 11 | 2 |
| 5.0 | 40 | 100 | 22 | 2 |
| 5.0 | 80 | 100 | 11 | 1 |
| 5.0 | 80 | 150 | 15 | 2/3 |

The color of the patina formed will be influenced or controlled by the ratio of sulphur dioxide to sodium carbonate and it has been found that within limits, high sulphur dioxide concentrations permit a wider range of sodium carbonate concentrations within which adherent deposits may be obtained.

It has also been found that within limits, the cell voltage is not of major importance, as satisfactory adherent deposits have been obtained with a cell voltage of from 10 to 30 volts when employing a current density of roughly from 50 to 200 amperes per square foot.

While it is evident from the above table that the ratio and concentrations of sulphur dioxide and sodium carbonate are somewhat variable, it may be said in a general way that an electrolyte containing 1 to 2 grams per liter of sulphur dioxide and from 30 to 60 grams per liter of commercial soda ash will impart a satisfactory patina in one or two minutes time, employing a current density of approximately 100 amperes and a range in cell voltage of from 10 to 30 volts.

While the approximate concentrations just set forth yield a green color and the solution has an appreciable life, the same result may be obtained with a more dilute solution having a shorter life or a more concentrated solution having a longer life. Nor are those concentrations to be regarded in any sense as minimum or maximum. For sulphur dioxide the minimum and maximum would vary from a trace (approximately .1 gram per liter) to a saturated solution (approximately 55 grams per liter) while the minimum and maximum carbonate limits are roughly from four to forty times the sulphur dioxide concentrations. It is, of course, obvious that soda ash or C. P. sodium carbonate may be used interchangeably and that only the cost of raw materials dictates the choice of sodium salts over their chemical equivalents. As already stated, sodium sulphite or sodium acid sulphite may be used instead of sulphur dioxide to supply the $SO_3$ radical.

The patina produced according to the present invention adheres well to the copper base and possesses a rich green color which may be varied toward blue or yellow and brown by respectively widening or decreasing the sulphur dioxide or sulphite and sodium carbonate ratio. In general, it is believed that the patina consists of a mixture of basic copper sulphate, copper sulphite and a small amount of copper carbonate.

It will be appreciated that by the novel improvements of the present invention, it is possible to produce patinated cupriferous articles in a wide variety of shapes and designs, including sheets as well as cast formed articles, the patina being susceptible of formation, in situ, in a variety of colors, hues and shades. While the patina formed in accordance with the teachings of the present invention is characterized by remarkably fine grain and ability to adhere to the surface upon which it is formed, yet it may be removed, if desired, by chemical or mechanical means to prepare the surface of the base metal to receive solders and brazes where it is desired to join a number of sheets or articles.

While certain novel features of the invention have been disclosed and are pointed out in the annexed claims, it will be understood that various omissions, substitutions and changes may be made by those skilled in the art without departing from the spirit of the invention.

What is claimed is:

1. The process for applying patina to a copper body which consists in establishing a basic solution comprising $SO_3$ and $CO_3$ radicals and subjecting the copper body to anodic treatment therein.

2. The method of producing an artificial adherent patina on copper or its alloys which comprises applying thereto an electrolyte embodying a strongly basic solution of readily soluble carbonates selected from the group comprising carbonates of the alkali metals and of ammonium, bicarbonates of the alkali metals and of ammonium, and then subjecting such electrolyte to electrolysis with the copper or copper alloy forming the anode.

3. The method of producing an artificial adherent patina on copper or its alloys which comprises applying thereto an electrolyte embodying a strongly basic solution of readily soluble carbonates selected from the group comprising carbonates of the alkali metals and of ammonium, bicarbonates of the alkali metals and of ammonium, and then passing a current of high current density through the electrolyte to effect electrolysis with the copper or copper alloy forming the anode.

4. An artificially produced adherent patina on copper or its alloys produced by the method of claim 3.

5. A copper sheet having a patina affixed thereto by anodic treatment in a solution of sodium sulphite and sodium carbonate.

6. A copper sheet having a patina affixed thereto by anodic treatment in a solution of sodium acid sulphite and sodium carbonate.

7. As an article of manufacture, a copper sheet having a patina affixed thereto by anodic treatment in an aqueous soluton of sulphur dioxide and sodium carbonate.

8. As an article of manufacture, a patinated copper sheet having a patina formed thereon by anodic treatment, said patina comprising substantially a mixture of basic copper sulphate, copper sulphite and copper carbonate.

FRANK F. POLAND.